June 7, 1932.  F. J. BECHERT  1,862,501
SPRING END CONNECTION
Filed Nov. 3, 1928
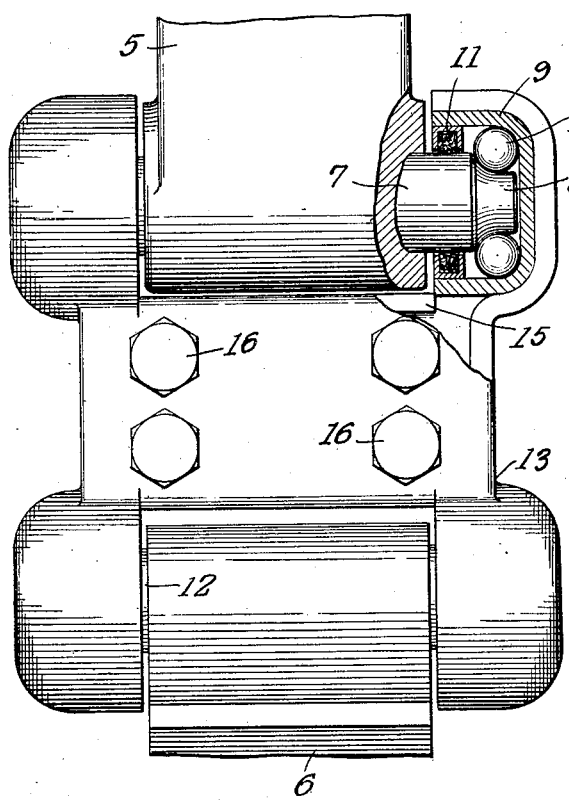
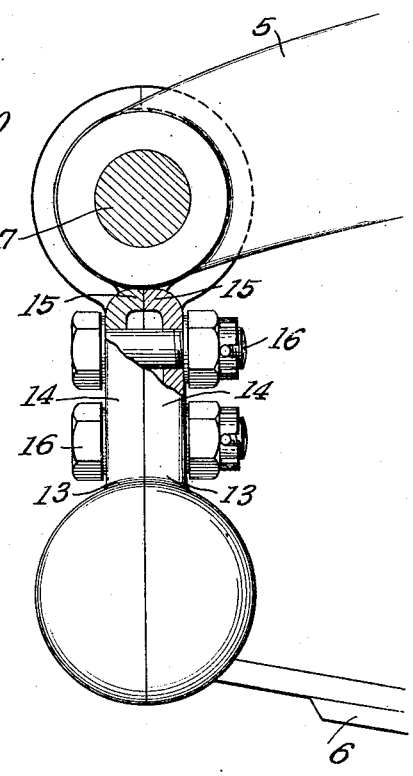
INVENTOR
Fred J. Bechert
BY
ATTORNEYS.

Patented June 7, 1932

1,862,501

UNITED STATES PATENT OFFICE

FRED J. BECHERT, OF STAMFORD, CONNECTICUT, ASSIGNOR TO THE FAFNIR BEARING COMPANY, OF NEW BRITAIN, CONNECTICUT, A CORPORATION OF CONNECTICUT

SPRING END CONNECTION

Application filed November 3, 1928. Serial No. 316,909.

My invention relates to an antifriction shackle construction for connecting the frame and spring of a motor vehicle.

Among the objects of the invention are: to provide a spring shackle construction which shall be very rigid, relatively cheap to manufacture, and which may be easily assembled.

Briefly stated, in the preferred form of the invention I provide completely enclosed antifriction bearings at opposite sides of the frame and the spring. The bearings on the frame and spring are held in shackle plate members, each having four bearing receiving recesses at the four corners thereof, bearing recesses in each said plate being of half cup formation so that complementary recesses on the opposed plates will form housings for the completely enclosed antifriction bearings. The shackle plates may be formed of sheet metal and provided with strengthening flanges, which may also serve to properly space the plates apart.

In the drawing which shows, for illustrative purposes only, a preferred form of the invention—

Fig. 1 is a rear view of a frame and spring connected together by one form of my improved shackle, one corner being shown in section;

Fig. 2 is a side view in partial section of the parts shown in Fig. 1.

In said drawing, 5 indicates a vehicle frame, while 6 indicates a spring to be connected thereto by means of my improved shackle. The spring and frame are each provided with antifriction bearings at opposite sides thereof, and these bearings are held in the shackle plates. In the particular form shown, a pin 7 is rigidly secured in the frame 5 and projects from opposite sides thereof. The pin ends may carry separate raceways or have raceways as 8 formed directly thereon. Complementary raceways, in this case the outer raceways, may be formed in cups 9, and antifriction bearing members such as balls 10 are interposed between the raceways 8 and the cups 9. The cups 9 are preferably closed, and suitable means such as an annular dust ring 11 serves to close the annular space between the open end of each cup 9 and the surface of the pin 7. Thus dust is excluded from the bearings, and a substantial supply of lubricant may be retained on the bearing surfaces. Since the arrangement at the opposite end of the pin 7 is preferably a duplicate of that shown in section in Fig. 1, the opposite end of the pin has not been shown.

The spring 6 may be provided with a pin 12 in all respects the same as the pin 7, and antifriction bearings are carried by the pin 12 the same as has been heretofore described.

The antifriction bearings are connected or held in operative relation to each other by means of a shackle plate member preferably divided along a plane passing through the axes of the pins 7 and 12. In the form shown, each of the shackle plates 13—13, which may be duplicates of each other, are formed with what may be termed half bearing cups at the four corners thereof, so that when the two shackle plates 13—13 are assembled as shown in Figs. 1 and 2, the complementary half bearing cups at all four corners of each plate form housings or recesses for holding the bearing rings or cups 9.

The plates 13—13 may be formed of sheet metal, and may be provided with struck-up flanges 14—14 intermediate the upper and lower cups and with transverse strengthening flanges 15—15 between aligned bearing cups. The half cups in each plate are preferably so formed that when the shackle plates are assembled, the outer ends of the cup recesses are closed. Means such as bolts 16—16 serve to hold the shackle plates together and the entire shackle construction in assembled relation.

It will be seen that since the bearings are held in half cups, all four of which are in a single plate, that the construction will be exceedingly rigid.

That portion of each shackle plate is preferably substantially continuous from side to side thereof at the region intermediate said half cups or depressions, thus forming a rigid and sturdy plate.

In assembling, the bearings may first be assembled upon the pin ends, and thereafter the two shackle plates, each with four half bearing cups thereon, are put in place, and the through bolts 15—15 set up for holding the plates together. By employing closed cups 9, no reliance need be placed upon a dust and waterproof joint between the plates 13—13 themselves, since the bearing members 10 are completely enclosed in the cups 9 and dust and water are excluded and lubricant retained by means of the dust rings 11. While I consider the closed cups 9 as highly desirable, it is to be understood that other forms could be used where suitable provision is made for excluding dust and water and retaining lubricant.

While the invention has been described in considerable detail, I do not wish to be strictly limited to the form shown, since changes may be made within the scope of the invention as defined in the appended claims.

I claim:

1. In a spring shackle construction, a pin to be secured to a frame, a pin to be secured to a spring, antifriction bearings at the ends of each of said pins, said bearings including outer race rings and antifriction bearing members, a pair of shackle plates each having four depressions at the corners thereof for receiving and sustaining the outer bearing raceways of said antifriction bearings, means for securing said shackle plates together, said plates having a substantially continuous portion at a region intermediate said pins and extending transversely from side to side of said plates and means for closing the spaces between said outer rings and pin ends.

2. In a spring shackle construction, shackle plate means having four substantially circular bearing supporting recesses at the four corners thereof, said shackle plate means being divided along a plane passing substantially through diameters of all of said substantially circular bearing supporting recesses, said shackle plate means having a substantially continuous portion at a region intermediate all of said recesses and extending transversely from side to side of said shackle plate means, a closed bottom bearing cup supported in each of said bearing recesses, antifriction bearing members within said cups, raceway means to be secured to a frame and coacting with said antifriction bearing members in two of said cups, raceway means to be secured to a spring and coacting with the antifriction bearing members in the other two of said cups, and means for closing the space between the open ends of said cups and said raceway means, whereby dust will be excluded from and lubricant retained on the antifriction bearing members.

3. In a spring shackle construction, raceway means to be secured to a frame and projecting from opposite sides thereof, antifriction bearing members on said raceway means, closed bearing cups surrounding said raceway means and coacting with said antifriction bearing members, annular dust ring means in the open end of each said cup for closing the annular open end of said cup, shackle plate means including two opposed plates each having four depressions therein for receiving each of said bearing cups, said plates being substantially continuous from side to side at a region intermediate all of said depressions, and means for holding said shackle plate members together.

4. In a spring shackle construction, a pair of shackle plate members each having four half bearing cups at the corners thereof, flange members on said shackle plate members to abut each other and definitely space said shackle plates, means for holding said shackle plates with said flange members in abutting relation to each other, and antifriction bearings in each bearing housing formed by complementary half cups in each of said shackle plate members.

5. In a spring shackle construction, a shackle plate member formed of sheet metal and having four half cups therein at the four corners thereof, and angularly extending strengthening flanges formed on said shackle plate intermediate the half cups therein, for the purpose described all parts of said plate being of substantially uniform thickness throughout.

6. In a spring shackle construction, a sheet metal plate, integral extensions from the four opposite corners of said plate, said extensions having depressions therein, said plate being substantially continuous from side to side thereof at the region intermediate said four extensions, means to be secured to a spring and frame and having antifriction raceways thereon, antifriction bearings on said raceways and housed within said depressions, means for excluding dust from and retaining lubricant on said antifriction bearing members, and means secured to said plate for closing said depressions to form four complete bearing housings at the corners of said plate.

FRED J. BECHERT.